United States Patent
Irle et al.

(10) Patent No.: US 6,384,597 B1
(45) Date of Patent: *May 7, 2002

(54) INDUCTIVE LINEAR SENSOR

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,947

(22) Filed: May 3, 2000

(30) Foreign Application Priority Data

May 3, 1999 (DE) .......................................... 199 20 190

(51) Int. Cl.$^7$ .............................. G01B 7/14; G01B 7/30
(52) U.S. Cl. .......................... 324/207.17; 324/207.25; 324/207.22; 324/207.18; 324/207.24
(58) Field of Search ................. 324/207.17, 207.25, 324/207.12, 207.22, 207.18, 207.24; 331/2

(56) References Cited

U.S. PATENT DOCUMENTS

| | | | | |
|---|---|---|---|---|
| 3,496,565 A | * | 2/1970 | Jenkins | 342/432 |
| 4,019,145 A | * | 4/1977 | Rathe | 327/4 |
| 4,380,733 A | * | 4/1983 | Yano et al. | 324/166 |
| 4,638,250 A | * | 1/1987 | Shen-Orr et al. | 324/207.17 |
| 4,680,721 A | * | 7/1987 | Pluddemann | 702/147 |
| 4,940,950 A | * | 7/1990 | Helfrick | 331/2 |
| 5,317,284 A | * | 5/1994 | Yang | 331/2 |
| 5,406,155 A | * | 4/1995 | Persson | 310/68 B |
| 6,011,389 A | * | 1/2000 | Masreliez et al. | 324/207.17 |
| 6,166,535 A | * | 12/2000 | Irle et al. | 324/207.25 |

FOREIGN PATENT DOCUMENTS

| | | |
|---|---|---|
| DE | 2416508 B2 | 10/1974 |
| DE | 2924092 C2 | 1/1981 |
| DE | 69502283 T | 3/1997 |
| DE | 19738836 A1 | 3/1999 |
| DE | 19738839 A1 | 3/1999 |

* cited by examiner

*Primary Examiner*—Safet Metjahic
*Assistant Examiner*—Wasseem H. Hamdan
(74) *Attorney, Agent, or Firm*—Birch, Stewart, Kolasch & Birch

(57) ABSTRACT

Disclosed are inductive linear and angle sensors for motor vehicles, which include an oscillator circuit for generating a periodic alternating-voltage signal; an exciting coil coupled to the oscillator circuit; several receiving coils; an evaluating circuit for evaluating signals induced in the receiving coils; and one movable inductive coupling element which influences a strength of inductive coupling between the excitation coil and the receiving coils. The one movable inductive coupling element of each sensor is varied in form to reduce residual error, which occurs during operation.

4 Claims, 4 Drawing Sheets

INDUCTIVE COUPLING ELEMENT WITH RECTANGULAR GEOMETERY

INDUCTIVE COUPLING ELEMENT WITH ADAPTED GEOMETERY

INDUCTIVE LINEAR SENSOR

BACKGROUND OF THE INVENTION

1. Field of the Invention

This application claims a priority based on German application 199 20 190.0 filed May 3, 1999, and the contents of that application are incorporated herein by reference.

This invention relates to inductive angle or linear sensors, more particularly to inductive angle or linear sensors for use on motor vehicles.

2. Background Art

German patent document DE 197 38 836 A1 discloses the measuring principle involved using an angle sensor. FIG. 3 of that German document also illustrates inductive coupling elements having meandering structures.

The output signals of such linear and angle sensors exhibit a certain residual error with respect to a position of the sensor. Such a residual error with respect to a linear sensor is illustrated in FIG. 1. In the Figure, a percentage error of the sensor is shown as a function of a scaled position of an inductive coupling element.

An analysis indicates that this error is caused by a non-linear progression of a magnetic field of the inductive coupling element. The progression is represented in FIG. 2 for a rectangular conductive grid, at a defined distance d.

A sinking of a plateau shown in the drawing, of a measured signal in the measuring direction causes a large part of the error. A six-fold repetition of the error across the measuring path during operation of the sensor results from the angle sensor having three receiving coils divided into six partial areas. The measuring principle of a sensor having several receiving coils is described in German patent document DE 197 38 839 A1.

The magnitude of the error represents a significant limitation to the operational accuracy that can be achieved by a sensor of this type.

It is therefore, an object of this invention to provide an inductive sensor in which an error that arises as a result of non-homogeneity of a magnetic field created by an inductive coupling element is significantly reduced.

SUMMARY OF THE INVENTION

According to principles of the present invention, an inductive linear sensor for a motor vehicle includes an oscillator circuit for generating a periodic alternating-voltage signal; an exciting coil coupled to the oscillator circuit; several receiving coils; an evaluating circuit for evaluating signals induced in the receiving coils; and one movable inductive coupling element which influences a strength of inductive coupling between the excitation coil and the receiving coils. In one embodiment of the invention, the inductive coupling element has a substantially rectangular shape but at least one outer boundary line thereof differs from the geometric shape of a straight line.

According another embodiment of the present invention, the inductive coupling element has a meandering conductive grid formed of opposite substantially circular arc sections having radial connecting lines extending between the circular arc sections, with a direction of at least one of the connecting lines differing from a radial direction.

Starting with an uncomplicated geometry of a moveable inductive coupling element having a rectangular conductive grid for a linear sensor, which is analogous to a closed loop for an angle sensor, and with a given geometry of a receiver conductive grid, the geometry the moveable inductive coupling element is purposely changed to achieve a desired result.

By this matching of the geometry of the inductive coupling element, the error is minimized so that, in general, a sensor with more exactness is achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is described and explained in more detail below using embodiments shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

An embodiment of the present invention is explained hereinbelow with reference to a linear sensor having substantially a rectangular inductive switching element. However, the problem and its solution described are completely analogous for inductive angle sensors.

Figure 1:
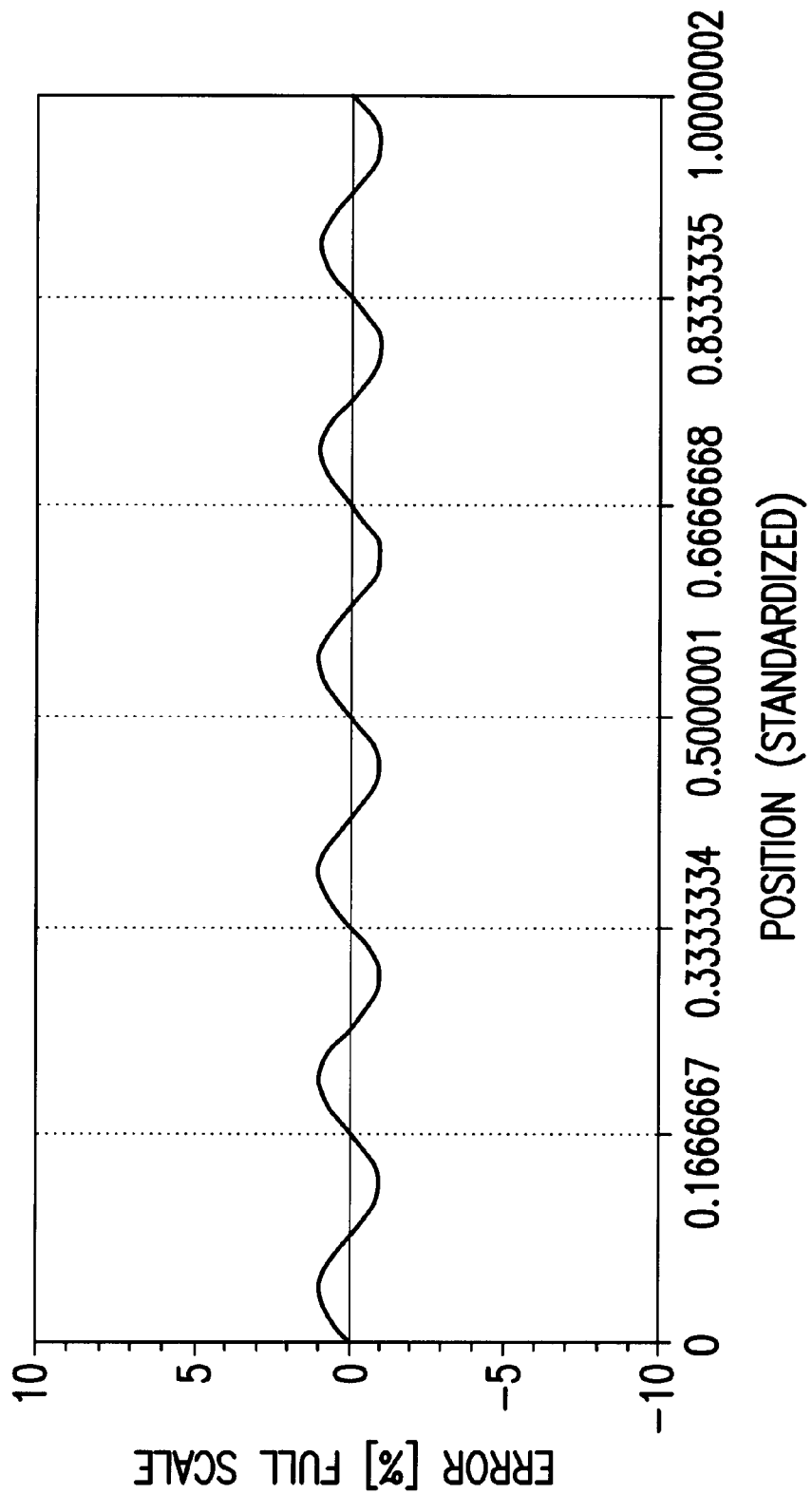
FIG. 1 is a graphic plot which illustrates a sinusoidal signal representative of a percentage of error as a function of a position of a movable inductive coupling element, of an inductive sensor of the type with which this invention is used.
Figure 2:
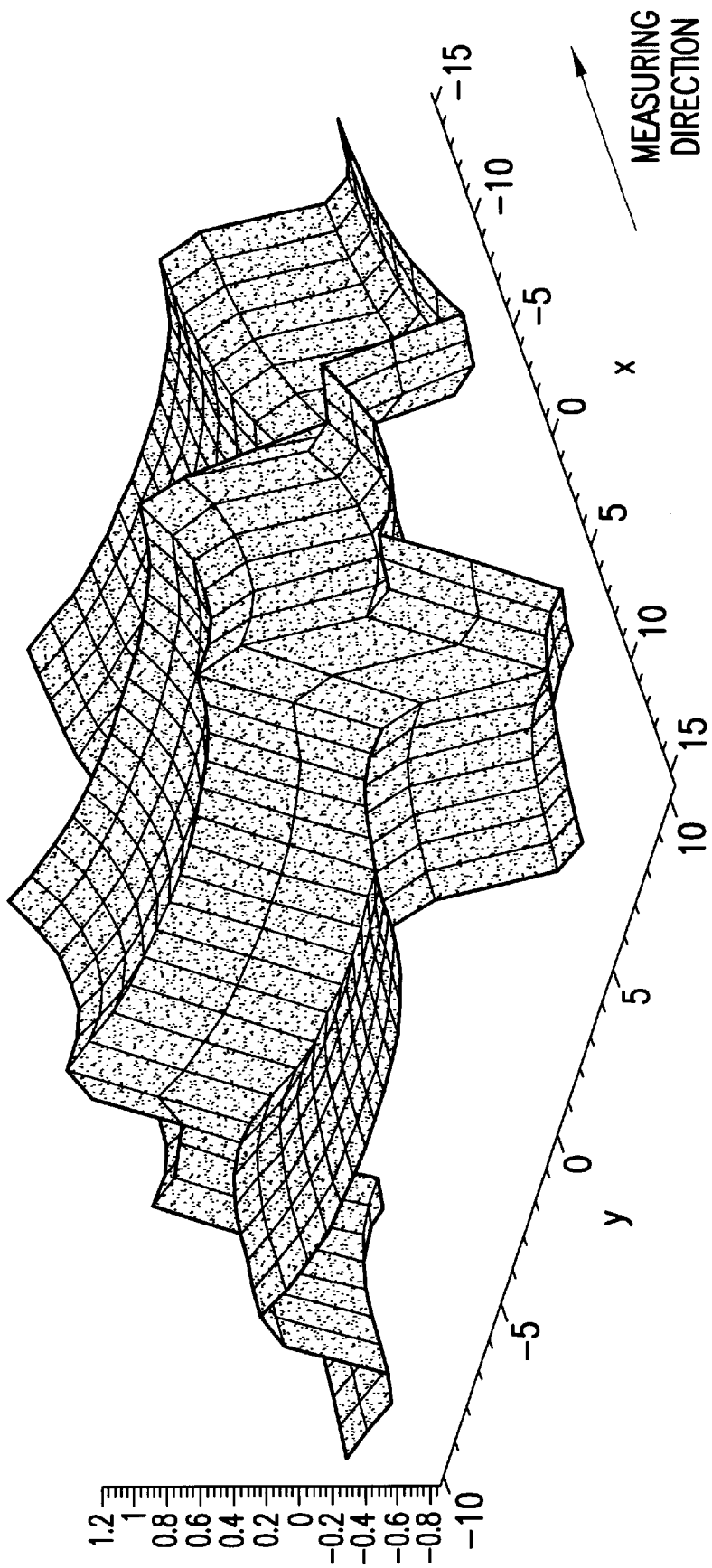
FIG. 2 is a three dimension graphic plot, which illustrates a magnetic field created during movement of the inductive coupling element of the sensor.
Figure 3:
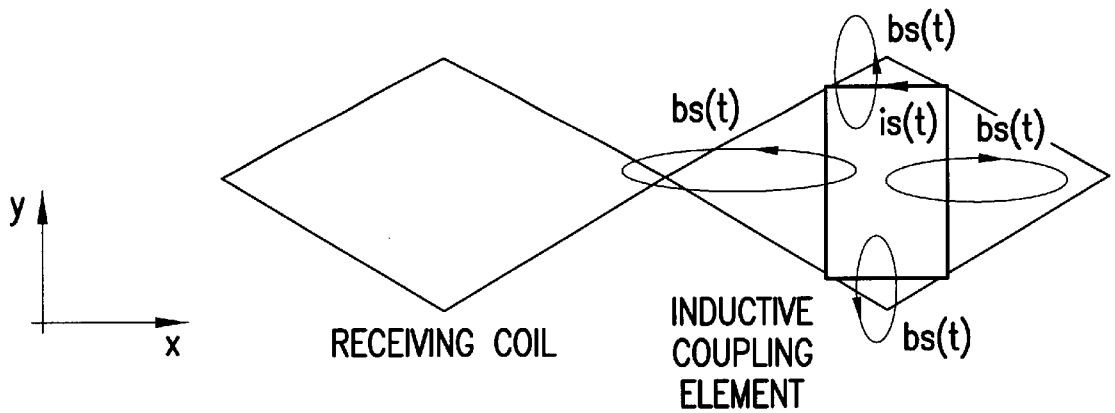
FIG. 3 is a schematic plan view of an inductive coupling element, having rectangular geometry, of a conventional inductive sensor.

FIG. 3 illustrates a schematic simplification of an inductive linear sensor 1 (of the general type of FIG. 5); specifically, a section of a receiving coil 3, as well as a movable inductive coupling element 5 having substantially rectangular geometry. For ease of understanding, other details are not shown in this view. In particular, the sending coil is not shown here and one must imagine it about the illustrated arrangement. (See however, FIG. 5).

The voltage induced by the movable inductive coupling element 5 in one of the receiving coils 3 is a time-dependent derivative of the magnetic flow $$U_i = -\frac{d\phi}{dt}.$$

The magnetic flow resulting in the conductive-grid plane of the receiving coils 3 from a given magnetic field progression, that is, determined by a given geometry of the movable coupling element 5 and a constant distance and constant y-position between the movable inductive switching element 5 and a stator, $b_s$ (t, x, x0, y), is $$\phi_{(t)} = \int_A b_s(t, x - x_0, y) dA,$$

where A is the surface of the receiving coil 3 and $x_0$ is the position of the movable inductive coupling element 5 with respect to the receiving coils 3 as the inductive coupling element 5 is moved in the measuring direction. The desired behavior is a linear interrelationship between $U_1$ and $x_0$: $U_1 = k \cdot x_0$. However, this can also be expressed so that the derivation of $U_1$ according to $x_0$, is a constant:

$$\frac{U_i}{dx_0} = const.$$

Using averaging over time to evaluate the signal, $$\frac{d\phi}{dx_0} = const$$

can be postulated directly for the desired behavior. Therefore, the time dependence of the signal is unimportant for this evaluation.

Assuming any geometry of the illustrated substantially rectangular movable inductive coupling elements 5, the calculation $$\frac{d}{dx_0} \int b_s(t, x - x_0, y) dA$$

does not yield a constant value.

According to the present invention, the geometry of the movable inductive coupling element 5 is varied so that this constant value requirement is met at least in an approximate manner. However, the necessary implementation of the inductive coupling element 5 cannot be determined mathematically, since this depends on the exact arrangement of the sending and receiving coils, which can have a relatively complex structure. Therefore, it is advantageous to determine the shape of the inductive coupling element 5 empirically; for example, by varying the shape of the coupling element 5 for a linear sensor, or the shape of a meandering coupling element for an angle sensor, so that the error signal is less and in the ideal case minimal.

Figure 4:
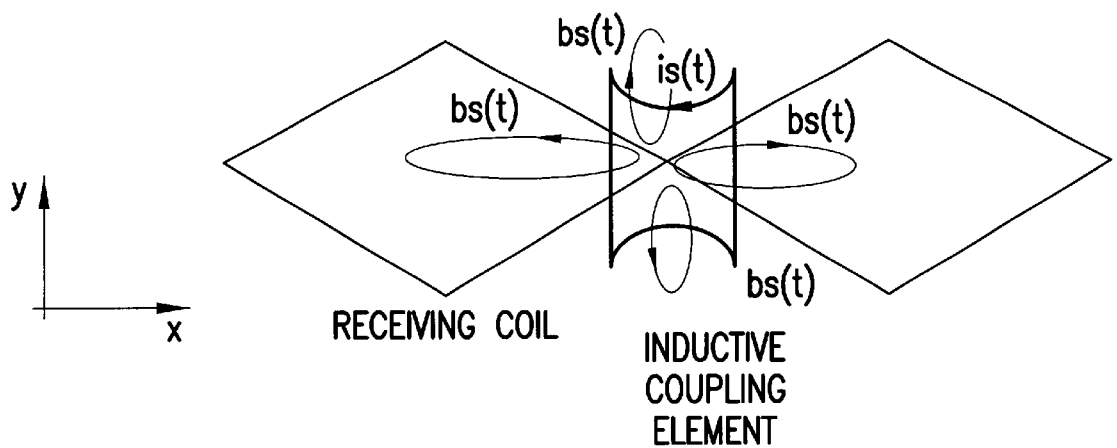
FIG. 4 is a schematic plan view of an inductive coupling element of an inductive sensor of this invention.

With respect to the linear sensor, as shown in FIG. 4, it has been found beneficial to curve at least one of the outer boundary lines of the (originally rectangular) inductive coupling element 5 in the form of a circular arc. For angle sensors, a minimizing of the error signal can be achieved in that the circular arc-shaped sections vary at least partly from the circular arc shape and/or the (originally) radial section is shaped at least partly in a manner varying from the radial direction. The exact shaping of the inductive coupling element depends on the geometry of the sensor and must be determined for each individual case.

Figure 6:
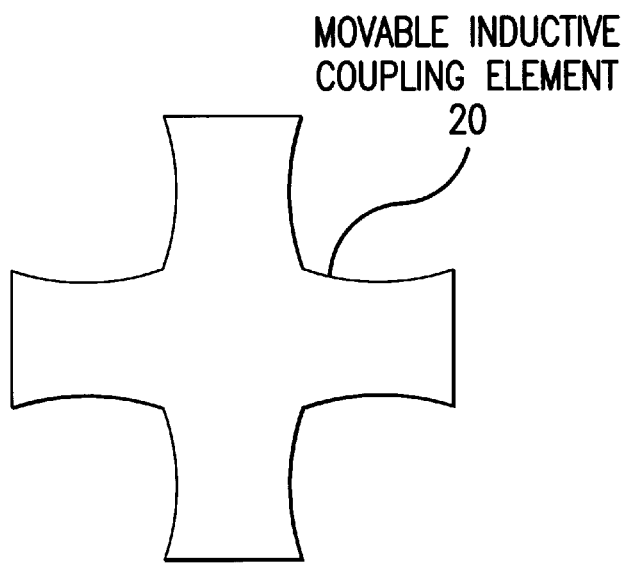
FIG. 6 is a graphical representation of a movable inductive coupling element.

FIG. 6 is a graphical representation of a movable inductive coupling element 20 for influencing a strength of inductive coupling between the exciting coil 7 and receiving coils 3. The movable inductive coupling element 20 has a meandering conductive grid formed of opposite, substantially circular arc, sections having lines extending between the circular arc sections. A direction of at least one of the lines differs from a radial direction. The circular arc sections form sections, which vary from the ideal circular arc shape.

Figure 5:
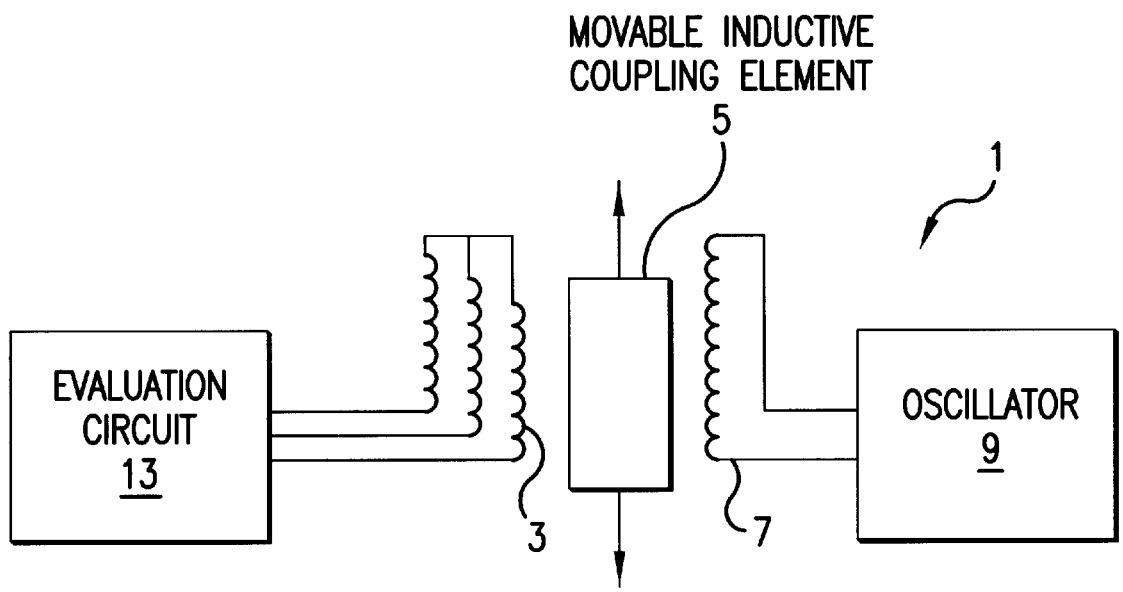
FIG. 5 is a schematic circuit diagram illustrating an inductive sensor of a general type with which the present invention is employed.

FIG. 5 is a schematic circuit diagram illustrating generally an inductive sensor 1 of the type with which the present invention is employed. The Figure illustrates receiving coils 3, a movable inductive coupling element 5, an exciting coil 7, an oscillator circuit 9 and an evaluation circuit 13.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inductive linear sensor for a motor vehicle, comprising:

an evaluation circuit;

an oscillator circuit for generating a periodic alternating-voltage signal;

an exciting coil coupled to the oscillator circuit;

several receiving coils coupled to the evaluation circuit with said evaluation circuit evaluating signals induced in the receiving coils; and one movable inductive coupling element for influencing a strength of inductive coupling between said exciting coil and said receiving coils;

wherein said coupling element has a substantially rectangular shape, but at least one outer boundary-edge line thereof differs from the geometric shape of a straight line.

2. An inductive sensor as in claim 1, wherein the at least one boundary-edge line is curved in the form of a circular arc.

3. An inductive angle sensor for a motor vehicle, comprising:

an evaluation circuit;

an oscillator circuit for generating a periodic alternating-voltage signal;

an exciting coil coupled to the oscillator circuit;

several receiving coils coupled to the evaluation circuit with said evaluation circuit for evaluating signals induced in the receiving coils; and one movable inductive coupling element for influencing a strength of inductive coupling between said exciting coil and said receiving coils, said one movable inductive coupling element having a meandering conductive grid formed of opposite, substantially circular arc sections having lines extending between the circular arc sections;

wherein a direction of at least one of the lines differs from a radial direction.

4. An inductive sensor as in claim 3, wherein the circular arc sections form sections which vary from an ideal circular arc shape.

* * * * *